(12) United States Patent
Rimoni et al.

(10) Patent No.: US 7,499,705 B2
(45) Date of Patent: Mar. 3, 2009

(54) HANDOVER IN A HYBRID COMMUNICATIONS NETWORK

(75) Inventors: Yoram Rimoni, Haifa (IL); Michael Green, Zichron Yaakov (IL)

(73) Assignee: Qualcomm Incorporated, San Diego, CA (US)

( * ) Notice: Subject to any disclaimer, the term of this patent is extended or adjusted under 35 U.S.C. 154(b) by 54 days.

(21) Appl. No.: 10/434,748

(22) Filed: May 9, 2003

(65) Prior Publication Data

US 2003/0227883 A1      Dec. 11, 2003

Related U.S. Application Data

(60) Provisional application No. 60/379,958, filed on May 10, 2002.

(51) Int. Cl.
*H04Q 7/20* (2006.01)
*H04Q 7/00* (2006.01)

(52) U.S. Cl. .............. 455/436; 455/442; 455/441; 455/444; 370/331; 370/344; 370/329

(58) Field of Classification Search ............ 455/436, 455/101, 426, 442, 444, 441; 370/331, 349, 370/339, 330, 344, 412, 335, 329, 401, 432.1, 370/435.1
See application file for complete search history.

(56) References Cited

U.S. PATENT DOCUMENTS

| | | | |
|---|---|---|---|
| 4,901,307 A | 2/1990 | Gilhousen et al. | 370/18 |
| 5,682,380 A | 10/1997 | Park et al. | 370/331 |
| 5,822,697 A | 10/1998 | Matsuzawa | |
| 5,850,606 A | 12/1998 | Bedingfield, Sr. et al. | 455/439 |
| 5,978,679 A | 11/1999 | Agre et al. | |
| 6,038,450 A * | 3/2000 | Brink et al. | 455/442 |
| 6,148,197 A | 11/2000 | Bridges et al. | 455/432 |
| 6,151,512 A * | 11/2000 | Chheda et al. | 455/562.1 |

(Continued)

FOREIGN PATENT DOCUMENTS

WO            0131963 A       5/2001

OTHER PUBLICATIONS

International Search Report, PCT/US03/014442, International Search Authority United States, Dec. 1, 2003.

*Primary Examiner*—Charles N Appiah
*Assistant Examiner*—Kiet Doan
(74) *Attorney, Agent, or Firm*—Sandip S. Minhas; Florin Corie; Thomas R. Rouse

(57) ABSTRACT

An apparatus and method of effecting hand-off of a mobile station in a first wireless communication system, which has a first mobile switching node operable with a first base station and a second mobile switching node operable with a second base station, and a second wireless communication system, is claimed. A handoff required message is received at the first mobile switching node, and sent to a second mobile switching node. A message from the second mobile switching node is sent to request allocation for a handoff. In an embodiment, this message is sent to the VLR of the second wireless communication system. In response, a handoff request acknowledge message is received by the second mobile switching node and sent to the first mobile switching node. An initial address message is sent to initiate a circuit connection between the first mobile switching node and the second mobile switching node. Then, the call is received from the first mobile switching node.

13 Claims, 8 Drawing Sheets

U.S. PATENT DOCUMENTS

| | | | |
|---|---|---|---|
| 6,157,833 A * | 12/2000 | Lawson-Jenkins et al. | 455/436 |
| 6,163,696 A * | 12/2000 | Bi et al. | 455/436 |
| 6,169,900 B1 | 1/2001 | Lahtinen | 455/439 |
| 6,243,582 B1 * | 6/2001 | Lahtinen | 455/436 |
| 6,285,880 B1 | 9/2001 | Gagnon et al. | 455/432 |
| 6,295,452 B1 * | 9/2001 | Choi | 455/436 |
| 6,353,607 B1 * | 3/2002 | Valentine et al. | 370/349 |
| 6,424,638 B1 * | 7/2002 | Ray et al. | 370/331 |
| 6,542,744 B1 * | 4/2003 | Lin | 455/437 |
| 6,650,899 B1 * | 11/2003 | Stumpert | 455/436 |
| 6,757,524 B1 * | 6/2004 | Hartikainen et al. | 455/101 |
| 6,836,471 B2 * | 12/2004 | Holma et al. | 370/331 |
| 7,149,524 B2 * | 12/2006 | Reynolds | 455/437 |
| 2002/0051432 A1 * | 5/2002 | Shin | 370/331 |
| 2002/0155831 A1 * | 10/2002 | Fodor et al. | 455/426 |
| 2003/0114155 A1 | 6/2003 | Jain et al. | |
| 2003/0133425 A1 | 7/2003 | Radhakrishnan et al. | |

* cited by examiner

HANDOVER IN A HYBRID COMMUNICATIONS NETWORK

CROSS-REFERENCE TO RELATED APPLICATION

This application claims the benefit of priority of U.S. Provisional Patent Application Ser. No. 60/379,958, filed May 10, 2002, which application is incorporated herein by reference.

BACKGROUND OF THE INVENTION

I. Field of the Invention

The present invention generally relates to wireless communications. More specifically, the present invention relates to a method of and an apparatus for providing continuous connectivity as a handset moves from one base station to another.

II. Description of Related Art

Code Division Multiple Access (CDMA) modulation is but one of several techniques for facilitating communications in which a large number of system user are present. Although other techniques, such as Time Division Multiple Access (TDMA), Frequency Division Multiple Access (FDMA), the Global System for Mobile Communications (GSM), AM modulation schemes, such as Amplitude Companded Single Side Band (ACSSB), Orthogonal Frequency Division Multiplexing (OFDM) and Integrated Dispatch Enhanced Network (iDEN) are also available, CDMA has significant advantages over these other modulation techniques. The use of CDMA techniques in a multiple access communication system is disclosed in U.S. Pat. No. 4,901,307, entitled "Spread Spectrum Multiple Access Communication System Using Satellite or Terrestrial Repeaters," assigned to the present assignee, which is incorporated by reference herein. In U.S. Pat. No. 4,901,307, a multiple access technique is described in which a large number of mobile telephone system users, each having a transceiver, communicates through satellite repeaters or terrestrial base stations (also known as cell base stations or cell sites) using CDMA spread spectrum communication signals. In using CDMA communications, the frequency spectrum can be reused multiple times, thus preventing an increase in system user capacity. The use of CDMA techniques results in a much higher spectral efficiency than can be achieved using other multiple access techniques.

In conventional cellular telephone systems, the available frequency band is divided into channels, typically 30 KHz in bandwidth, while analog FM modulation techniques are used. The system service area is divided geographically into cells of varying size. The available frequency channels are divided into sets with each set usually containing an equal number of channels. The frequency sets are assigned to cells in such a way as to minimize the possibility of co-channel interference. For example, consider a system in which there are seven frequency sets and the cells are equal size hexagons. A frequency set used in one cell will not be used in the six nearest or surrounding neighbors of that cell. Furthermore, the frequency set in one cell will not be used in the twelve next nearest neighbors on that cell.

A more difficult situation is presented by movement of the mobile station into a cell serviced by a base station from another cellular system. A complicating factor in such inter-system handoffs is that the neighboring cellular system often has dissimilar characteristics and requirements. For example, adjacent cellular systems may often operate at different frequencies, and maintain different levels of base station output power, pilot strength, or capacity. Further, adjacent cellular systems may require different messaging structures, even for similar types of messages or the functionalities thereof. For example, the so-called the GSM standard does not have a mechanism for soft handoff. There is, therefore, a problem in handing off a call using the error interface from a CDMA network to a GSM network, or vice-versa.

One way of addressing this problem is to modify GSM to enable it to effect handoff to a non-GSM system, that is, a CDMA system. Another way of dealing with this problem is to modify CDMA to handle mechanisms that are standard in a GSM system. However, both CDMA and GSM are well-established systems, and operators and equipment providers are reluctant to make expensive modifications to existing equipment in order to accommodate a neighboring incompatible system. If new messages are added to the error interface in support of dual mode mobile stations, then modifications must be made to support these new messages using existing hardware. Plainly, this is undesirable from the perspective of the operator and the equipment provider.

SUMMARY OF THE INVENTION

The invention addresses the above-discussed problem.

An aspect of a hybrid communication system is to seamlessly integrate a standard GSM network in with a standard CDMA network. This may be achieved by using a hybrid Mobile Switching Node (MSN) that supports the inner working function between a CDMA-compliant Radio Access Network (RAN) and a GSM core network. The hybrid MSN is capable of interfacing with standard GSM core network entities, such as the GSM High-Level Register (HLR), Authentication Center (AuC) and a Short Message Service Center (SMSC). Thus, a system built around a standard CDMA error interface will not require changes to a CDMA-based RAN or a GSM core network. Such a system comprises a dual mode mobile station capable of interfacing with a standard GSM Subscriber Identity Module (SIM) and to respond to GSM authentication procedures.

Accordingly, an embodiment of the invention provides for an apparatus and method of effecting hand-off of a mobile station in a first wireless communication system, which has a first mobile switching node operable with a first base station and a second mobile switching node operable with a second base station, and a second wireless communication system. In an embodiment, the first wireless communication system is a CDMA based system, and the second wireless communication system is a GSM-based or an iDEN based system. It is also contemplated that the second wireless communication system may be an OFDM based system.

A handoff required message is received at the first mobile switching node. A handoff request message is sent from the first mobile switching node to the second mobile switching node. A message from the second mobile switching node is sent to request allocation for a handoff. In an embodiment, this message is sent to the VLR of the second wireless communication system. In response, a handoff request acknowledge message is received by the second mobile switching node. A handoff request acknowledge message is then sent from the second mobile switching node to the first mobile switching node. An initial address message is sent to initiate a circuit connection between the first mobile switching node and the second mobile switching node. Then, the call is received from the first mobile switching node.

A signal indicating that a circuit for the call has been reserved from the second mobile switching node is sent to the first mobile switching node. Upon receipt, a handoff execution message is sent from the first mobile switching node. A handoff commenced message is received at the first mobile switching node, which then sends a handoff complete message.

The above and further features of the invention are set forth with particularity in the appended claims and together with the advantages thereof will become clear from consideration of the following detailed description of an exemplary embodiment of the invention given with reference to the accompanying drawings.

DETAILED DESCRIPTION OF THE PREFERRED EMBODIMENT

Figure 1:
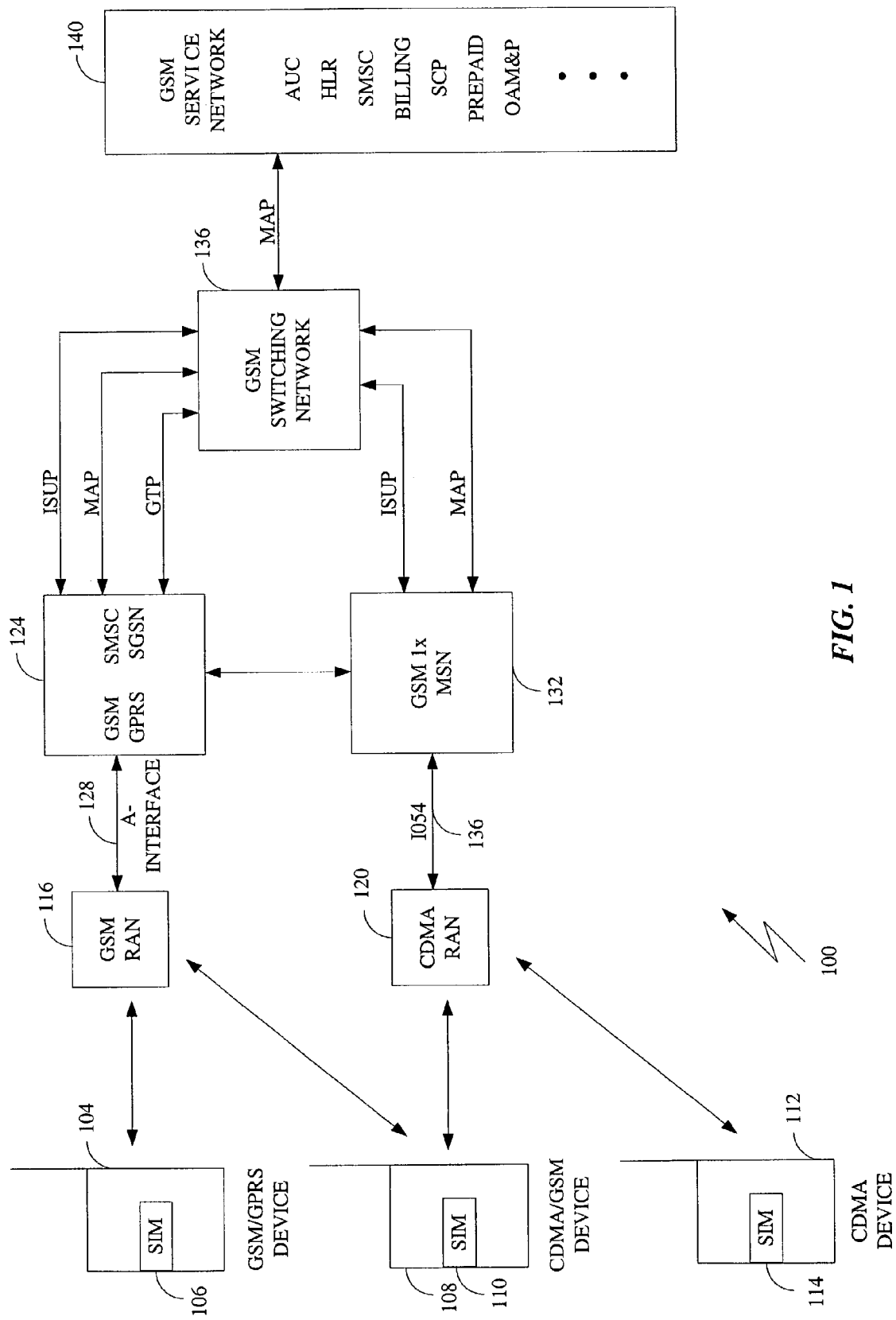
FIG. 1 illustrates a schematic representation of a hybrid cellular system.

FIG. 1 is a schematic illustration of an exemplary cellular telephone system 100. The illustrated system may utilize any of various multiple access modulation techniques for facilitating communications between a typically large number of system mobile stations or mobile telephones, and the base stations. Such multiple access communication system techniques include: time division multiple access (TDMA), global system for mobile communications (GSM), General Packet Radio Service (GPRS), High Speed Circuit Switched Data (iDEN), frequency division multiple access (FDMA), code division multiple access (CDMA), TS code division multiple access (TSCDMA) orthogonal frequency division multiplexing (OFDM) and AM modulation schemes such as amplitude companded single sideband.

For purposes of illustration, FIG. 1 describes the communications system as a combination of a CDMA based system and a GSM based system. It should be understood that any two communications systems may be employed, such as the communications systems discussed above.

Mobile station 104 exemplifies a GSM/GPRS device, having a subscriber identity module 106. Mobile station 108 exemplifies a GSM/CDMA2001x device, having a subscriber identity module 110. Mobile station 108 may be equipped with hardware and/or software modifications from traditional GSM or CDMA mobile stations, rendering the device to interface with both GSM and CDMA infrastructure. Mobile station 112 exemplifies a CDMA20001x device, having a subscriber identity module 114.

Mobile stations 104, 108 and 112 are wireless communication devices, such as mobile telephone, a personal digital assistant, computer or other wireless device capable of wireless communication of voice or data information. The SIM cards 106, 110, and 114 may be a standard GSM SIM card that is operable in a CDMA 1x handset, capable of receiving and reacting to signals from base stations within both CDMA and GSM cellular systems. Such a GSM SIM card 108 integrated with a CDMA1x handset is discussed in U.S. Provisional Patent Application No. 60/350,829, filed Jan. 17, 2002, and U.S. Provisional Patent Application No. 60/354,086, filed Feb. 1, 2002, both converted to U.S. patent application Ser. No. 10/076,831, filed Feb. 14, 2002, assigned to the same assignee as the present application, and is specifically enclosed by reference herein. The SIM cards 106, 110, and 114 may also be a specialized SIM card configured to operate in more than one wireless communication system.

Mobile station 104 is communicably coupled with radio access network (RAN) 116. In an embodiment, RAN 116 is a standard GSM or GSM/GPRS RAN, comprising standard GSM based base transceiver sub-system(s) (BTS) and a standard GSM base station controller (BSC) (not shown).

Mobile stations 108 and 112 are communicably coupled with radio access network (RAN) 120. Mobile station 108 may be communicably coupled with both RAN 116 and RAN 120. In an embodiment, RAN 120 is a CDMA1x RAN as described in U.S. Provisional Patent Application No. 60/340,356, filed Dec. 14, 2001, converted to U.S. patent application Ser. No. 10/077,556, filed Feb. 14, 2001, assigned to the same assignee as the present application, and is specifically enclosed by reference herein. RAN 120 is a standard CDMA2000 or CDMA 20001x RAN, comprising standard CDMA-based base transceiver sub-system(s) (BTS) and a standard CDMA-based base station controller (BSC) (not shown).

GSM RAN 116 is coupled to a GSM SMSC/SGSN 124, over an A-interface 128. The GSM SMSC/SGSN 124 is coupled to a GSM switching network 136, using MAP, ISUP, and GTP interfaces and protocols.

CDMA RAN 120 is coupled to a GSM1x mobile switching node (MSN) 132, over a standard IOS4 interface/protocol 136. MSN 132 is preferably a hybrid MSN that is coupled to both RAN 120 and GSM switching network 136. GSM switching network 136 is coupled to the remainder of a GSM service network 140. MSN 132 is capable of communicating to both RAN 120 and GSM service network 140 by mapping messages expected in formats and structures in one cellular communication systems to formats and structures in a second cellular communication system. For example, if one communication system is a GSM system, and the second communication system is a CDMA2000-1x system, hybrid MSN 132 maps messages from formats and structures known in the GSM system to that known in a CDMA1x system, and vice-versa.

Figure 2:
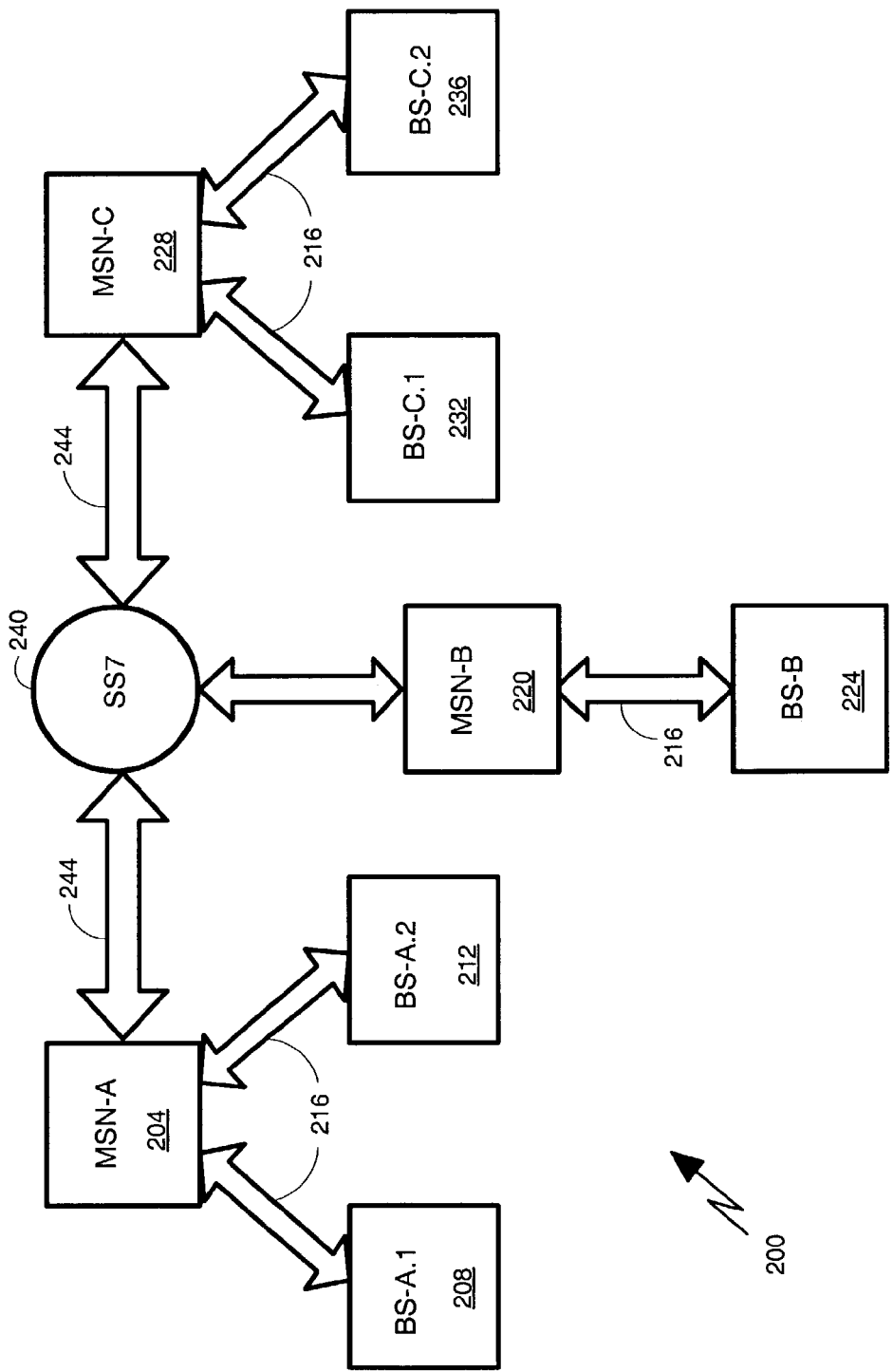
FIG. 2 illustrates the interfaces in a network of multiple MSNs and Base Stations (BS)

FIG. 2 illustrates the various interfaces in a network of multiple mobile switching nodes (MSNs) and base stations (BS) 200. In FIG. 2, a plurality of MSNs, each having one or more associated base stations, are interconnected. MSN-A 204 interfaces with BS-A.1 208 and BS-A.2 212 over a standard CDMA IOS-A interface 216. Similarly, MSN-B 220 interfaces with BS-B 224 over the IOS A-interface 216. Also, MSN-C 228 interfaces with BS-C.1 232 and BS-C.2 236 over the same IOS A-interface 216. Each MSN 204, 220, and 228 interfaces the GSM core network (SS7) 240 over a GSM MAP/E interface 244. IOS messages are encapsulated in GSM A-interface BSSAP data, and transported over a GSM MAP/E interface 244. The BSSAP data may comprise a BSSAP header and either a DTAP or IBSSMAP layer 3 message, and is encapsulated in the GSM MAP/B interface in the BSS-APDU parameter.

Figure 3:
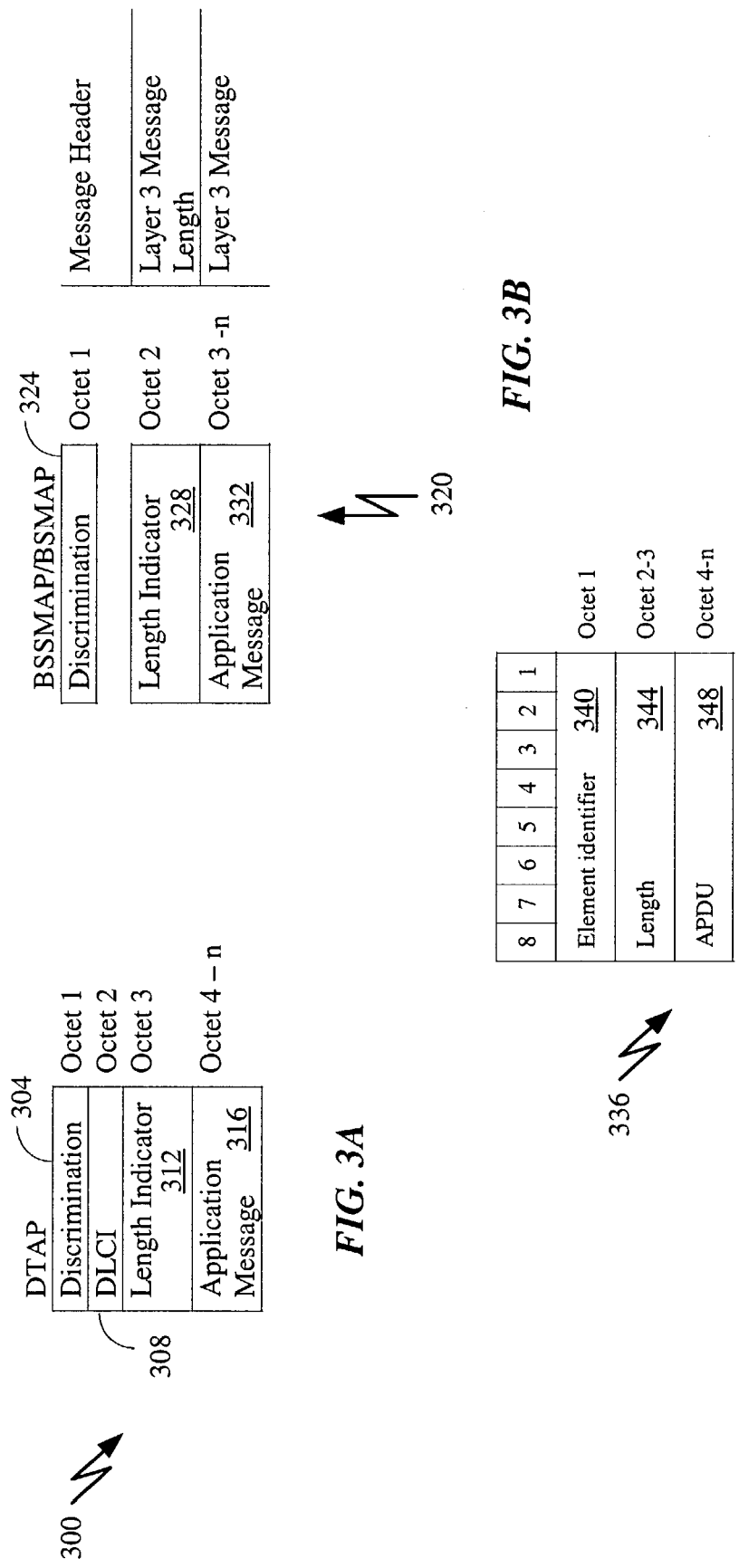
FIG. 3A illustrates a DTAP data structure.
FIG. 3B illustrates a BSSMAP/BSMAP data structure.
FIG. 3C illustrates a BSS-APDU data structure.

FIG. 3A illustrates a DTAP data structure 300. The DTAP data structure comprises a plurality of octets. Specifically, the DTAP data structure comprises octet1 (discrimination 304), octet2 (DLCI 308), octet3 (length indicator 312), and octet4-N (application message 316).

FIG. 3B illustrates a BSSMAP/BSMAP data structure 320. The BSSMAP/BSMAP data structure 320 comprises octet1 (discrimination 324), octet2 (length indicator 328), and octet3-N (application message 332).

FIG. 3C illustrates a BSS-APDU data structure 336. The BSS-APDU data structure 336 comprises octet1 (element identifier 340), octet2-3 (length 334), and octet4-N (APDU 348). The length restrictions of the APDU field 348 in the BSS-APDU data structure 336 are sufficient for encapsulating IOS A-interface messages. The IOS A-interface messages may be encapsulated in the BSS-APDU data structure 336, and transported over the GSM MAP/E interface 244 in the same manner as in a standard GSM system.

A scenario may arise where a single MSN potentially be simultaneously connected to both a GSM1X and a GSM RAN. Thus, the MSN may have to differentiate between MAP/E interface messages received from each radio access network (RAN). According to the GSM standard, the discrimination pattern (304, 324) is coded in one octet. The least significant bit of the octet is referred to as bit D, and indicates whether the message is a DTAP data structure 300 or a BSS-MAP/BSMAP data structure 320. If the message is a DTAP data structure 300, the value of D=1, and if the data structure is a BSSMAP/BSMAP data structure 320, the value of D=0. The other bits of the octet may be used to separate message groups for different error interfaces. Before encapsulating an IOS A-interface message, the MSN may set the most significant bit to "1." This bit may be ignored by a standard GSM RAN.

Figure 4:
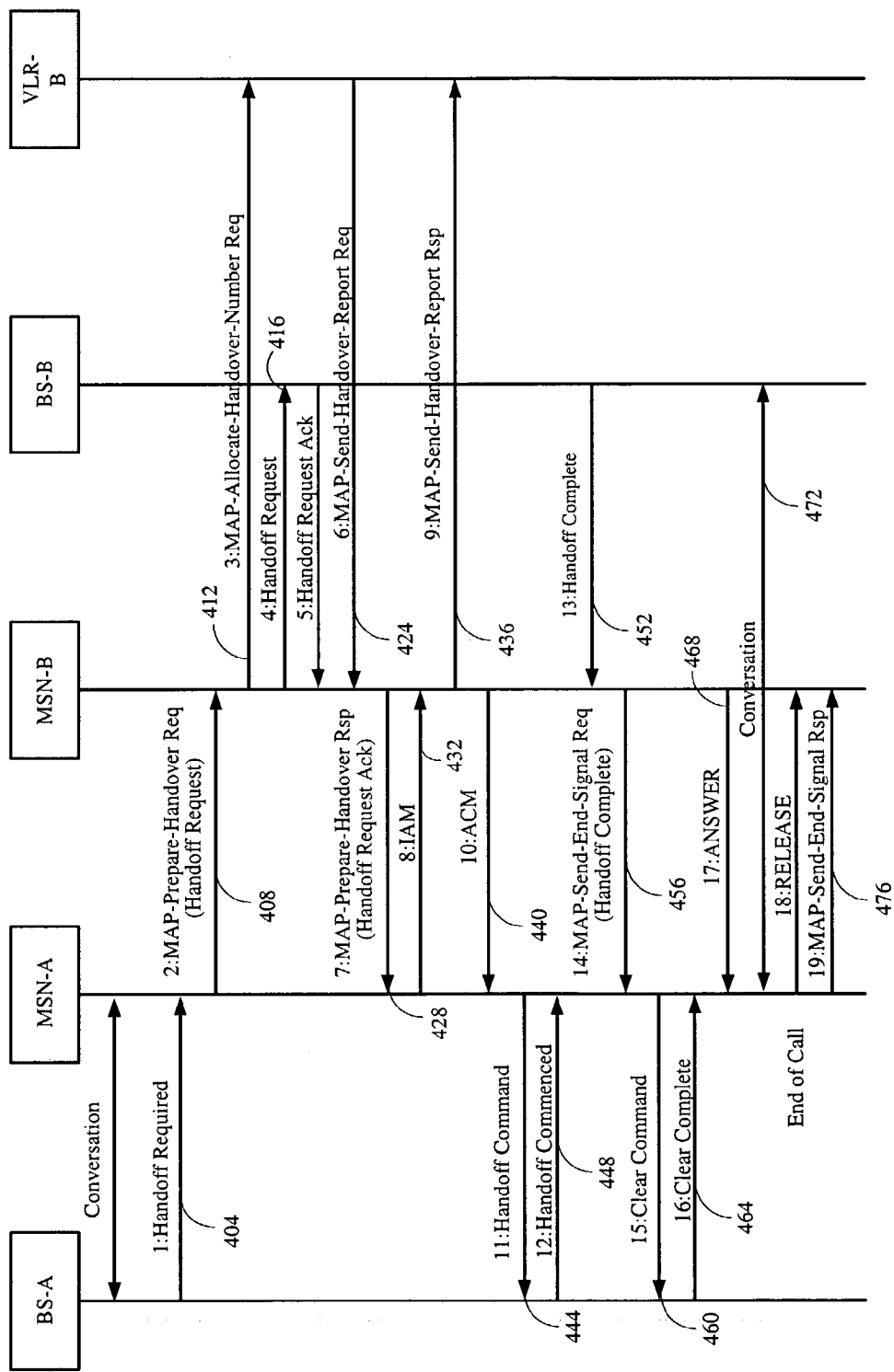
FIG. 4 illustrates the signaling in an inter-MSN handover.

FIG. 4 illustrates signaling for a successful basic inter-MSN handover requiring a circuit connection between MSN-A and MSN-B. In this embodiment, a handover is initiated by BS-A. A handoff request message 404 is sent to MSN-A. MSN-A sends a MAP-prepare-handover request 408 to MSN-B, which comprises a complete handoff request message. MSN-B requests 412 a handover number from its associated VLR. The handover number may be used for routing the connection of the call from MSN-A to MSN-B. MSN-B then requests 416 allocation of radio resources. This may be done by sending the received handoff request message to BS-B. Upon successful allocation of radio resources, BS-B responds with a handoff request act message 420. The VLR returns 424 the assigned handover number to MSN-B.

Upon receiving the handover number, MSN-B returns a MAP-prepare-handover response 428 to MSN-A, comprising the complete handoff request acknowledge message received from BS-B. MSN-A then sends an SS7 Initial Address Message (IAM) 432 to initiate a circuit between MSN-A and MSN-B. Upon receiving a call from MSN-A using the handover number, MSN-B releases the handover number in the VLR by sending 436 a MAP-send-handover-report response.

MSN-B then signals 440 to MSN-A that a circuit for the call has been reserved. Upon receiving the signal, MSN-A initiates the handover execution command 444. The BS-A then sends a handoff commenced message 448 to MSN-A. BS-B sends a handoff complete message 452 to MS-B, signaling that the mobile station is successfully communicating with BS-B. MSN-B then sends a MAP-send-end-signal request 456 to MSN-A, comprising the complete handoff complete message. MSN-A sends a clear command message 460 to BS-A to release radio resources. BS-A sends a clear complete message 464 to MSN-A, signaling that all resources have been cleared.

Upon receiving the handoff complete message from BS-B, MSN-B generates a SS7 answer signal 468 towards MSN-A. Upon termination of the call (either by the mobile station or by the fixed subscriber), MSN-A clears 472 the circuit between MSN-A and MSN-B. MSN-A then sends a MAP-send-end-signal response 476 to MSN-B to release the MAP resources in MSN-B.

Figure 5:
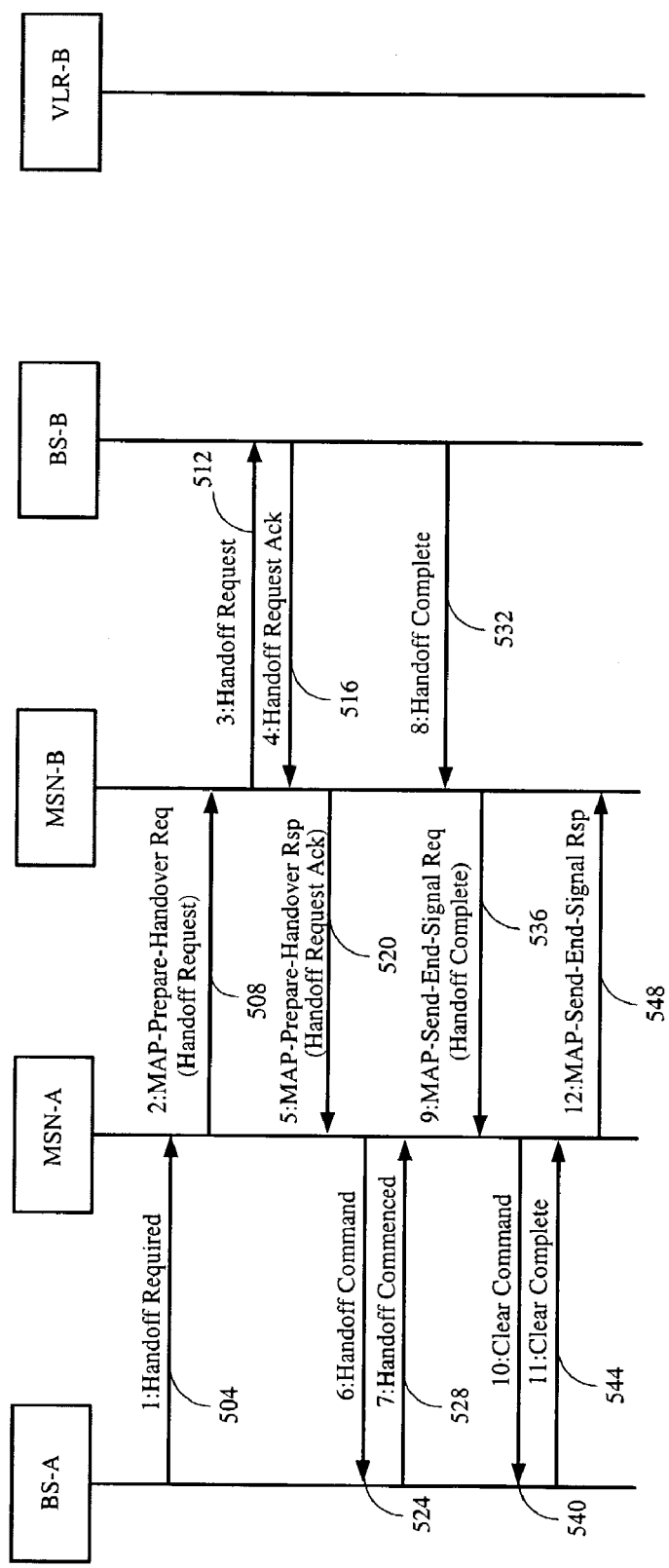
FIG. 5 illustrates a basic handover process without a circuit connection.

FIG. 5 illustrates a basic handover technique without using a circuit connection 500. In this embodiment, the handover is initiated BS-A. A handoff request message 504 is sent to MSN-A. MSN-A sends a MAP-prepare-handover request 508 to MSN-B, comprising a complete handoff request message. MSN-B requests the allocation of radio resources by sending received handoff request message 512 to BS-B. Upon successful allocation of radio resources, BS-B responds with a handoff request acknowledge message 516. Upon receiving the handoff request acknowledge message 516, MSN-B returns a MAP-prepare-handover response 520 to MSN-A, comprising the complete handoff request acknowledge message 516 received from BS-B. MSN-A then initiates the handover execution command 524.

BS-A then sends a handoff commenced message 528 to MSN-A. BS-B sends a handoff complete message 532 to MSN-B, signaling that the mobile station is successfully communicating with BS-B. MSN-B then sends a MAP-send-end-signal request 536 to MSN-A, comprising the complete handoff complete message. MSN-A sends a clear command message 540 to release radio resources. BS-A then sends a clear complete message 544 to MSN-A, signaling that all resources have been cleared. MSN-A then sends a MAP-send-end-signal response 548 to MSN-B to release the MAP resources in MSN-B. Note that in the description of FIG. 5, messaging regarding circuit establishment and information regarding handover number allocation are not necessary.

The handover procedure is normally triggered by BS-A sending a handoff required message on the IOS A-interface to MSN-A. This indication of the basic inter-MSN handover procedure is performed and controlled by MSN-A. The sending of the MAP-prepare-handover request to MSN-B is triggered in MSN-A upon receipt of the handoff-required message. The cell identity of the cell where the call is to be handled over in a MSN-B area, provided in the handoff request message, is mapped into the target cell ID MAP parameter and the handoff request message is encapsulated in the BSS-APDU MAP parameter of the MAP-parameter-handover request.

Figure 6:
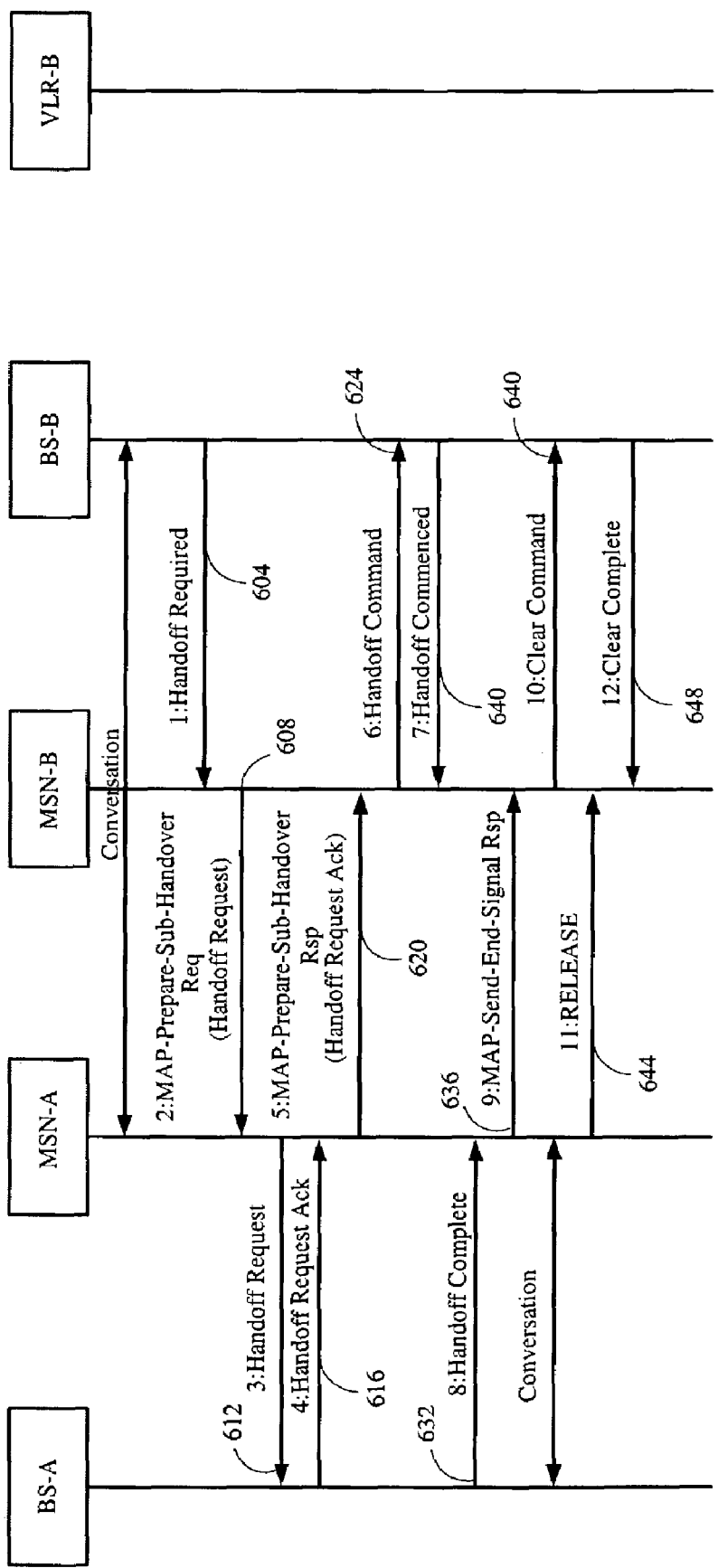
FIG. 6 illustrates the signaling for successful subsequent inter-MSN handover.

FIG. 6 illustrates the signaling for successful subsequent inter-MSN handover from MSN-B to MSN-A requiring a circuit connection between MSC-A and MSC-B 600. BS-B sends a handoff required message 604 to MSN-B. In response, MSN-B sends a MAP-prepare-subsequent-handover request 608 to MSN-A, indicating the new MSN number, and comprising a complete handoff request message. Since MSN-A is the call controlling MSN, a handoff number is not required for call routing. Thus, MSN-A immediately initiates radio resource allocation by sending the received handoff request 612 to BS-A.

On successful allocation of radio resources, BS-A responds with a handoff request acknowledge message 616. MSN-A then sends a MAP-prepare-subsequent-handover response 620 to MSN-B, comprising the complete handoff request acknowledge message. MSN-B then initiates a handoff command 624. In response, BS-B sends a handoff-commenced message 628 to MSN-B. BS-A then sends a handoff complete message 632 to MSN-A, signaling that the mobile station is successfully communicating the BS-A. MSN-A then sends a MAP-send-end-signal response 636 to MSN-B. Upon receiving the MAP-send-end-signal response 636, MSN-B sends a clear command message 640 to BS-B so that radio resources may be released. After sending the MAP-send-end-signal responds 636, MSN-A clears 644 the circuit between MSN-A and MSN-B. BS-B sends a clear complete message 648 to MSN-B signaling that all resources have been cleared.

A difference in the procedure for a subsequent handover from MSN-B to MSN-A without a circuit connection and the procedure for a subsequent handover from MSN-B to MSN-A requiring a circuit connection is that no circuit release (644) is needed between MSN-A and MSN-B.

Figure 7:
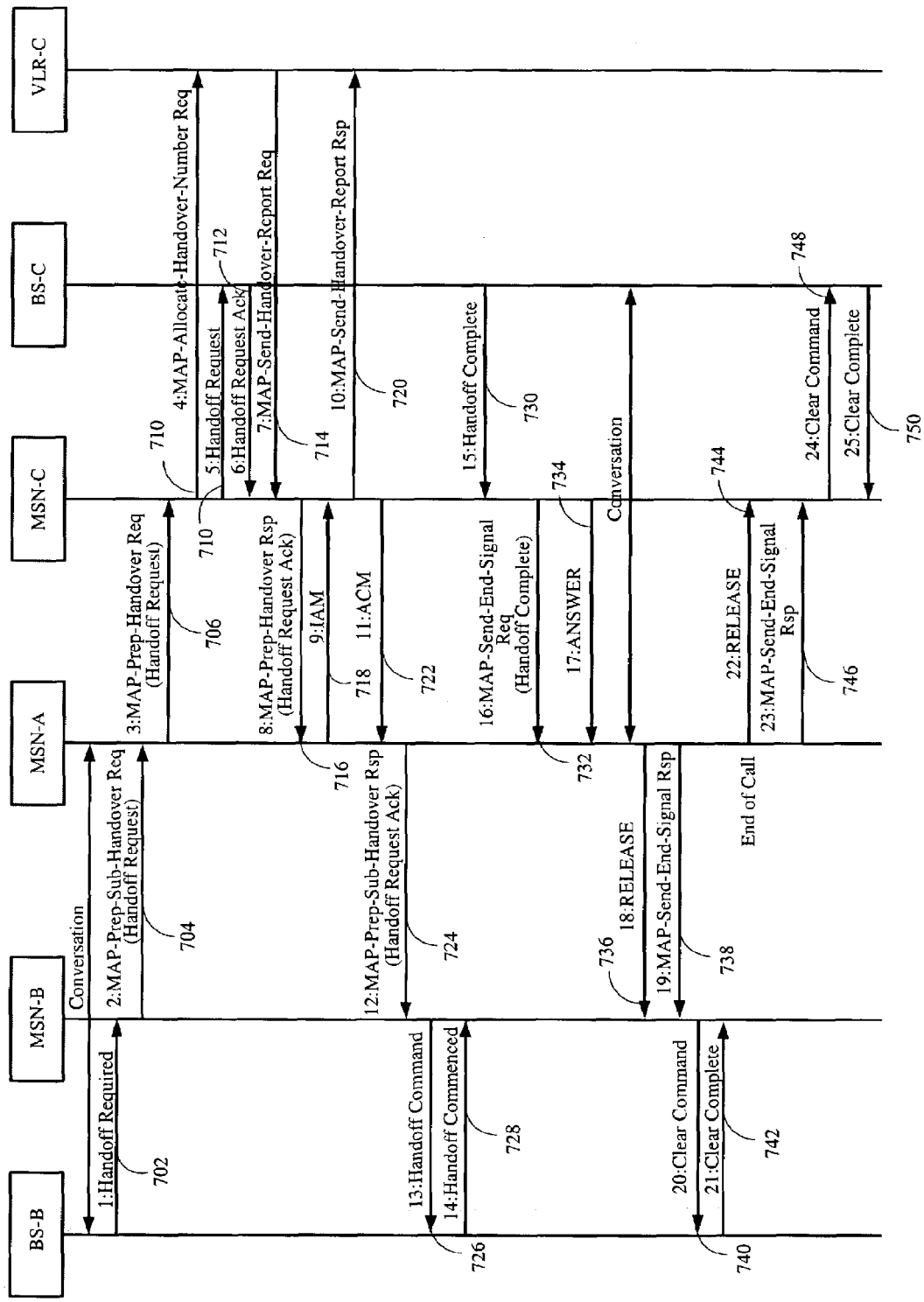
FIG. 7 illustrates the signaling for subsequent handover from MSN-B to MSN-C requiring a circuit connection between MSN-A and MSN-C.

FIG. 7 illustrates the signaling 700 for a successful subsequent handover from MSN-B to MSN-C requiring a circuit connection between MSN-A and MSN-C. The handover is initiated by BS-B, by sending a handoff request message 702 to MSN-B. MSN-B sends a MAP-prepare-subsequent-handover request 704 to MSN-A indicating the new MSN number, which is that of MSN-C, and comprising a complete handoff request message. MSN-A then sends a MAP-prepare-handover request 706 to MSN-C, comprising a complete handoff request message. MSN-C then requests 708 a handover number from its associated VLR. The handover number may be used for routing the connection of the call from MSN-C.

MSN-C then requests 710 the allocation of radio resources by sending the received handoff request message to BS-C. Upon successful allocation of radio resources, BS-C responds with a handoff request acknowledge message 712. The VLR then returns 714 the assigned handover number the MSN-C. Upon receiving the handover number, MSN-C returns a MAP-prepare-handover response 716 to MSN-A, comprising the complete handoff request acknowledge message 712 received from BS-C.

MSN-A then sends a SS7 Initial Address Message (IAM) 718 to initiate a circuit connection between MSN-A and MSN-C. Upon receiving the call from MSN-A using the handover number, MSN-C releases the handover number in the VLR by sending a MAP-send-handover-report response 720. MSN-C then signals 722 to MSN-A that a circuit for the call has been reserved. MSN-A then sends a MAP-prepare-subsequent-handover response 724 to MSN-B, comprising the complete handoff request acknowledge message. MSN-B then initiates the handover command 726. In response, BS-B sends a handoff commence message 728 to MSN-B. BS-C then sends a handoff complete message 730 to MSN-C, signaling that the mobile station is successfully communicating with BS-C. MSN-C then sends a MAP-send-end-signal request 732 to MSN-A, comprising the complete handoff complete message.

Upon receiving the handoff complete message 732 from BS-C, MSN-C generates a SS7 answer signal 734 and transmits to MSN-A. MSN-A then clears 736 the circuit between MSN-A and MSN-B. MSN-A then sends a MAP-send-end-signal response 738 to MSN-B which releases the MAP resources in MSN-B. MSN-B then sends a clear command message 740 to BS-B to release radio resources. In response, BS-B sends a clear complete message 742 to MSN-B, signaling that all resources are cleared.

Upon termination of the call, either by the mobile station or by the fixed subscriber, MSN-A clears 744 the circuit between MSN-A and MSN-C. MSN-A then sends a MAP-send-end-signal response 746 to MSN-B, which then releases the MAP resources in MSN-C. MSN-C then sends a clear command message 748 to BS-C to release the radio resources. BS-C then sends a clear complete message 750 to MSN-C, thus signaling that all resources have been cleared.

Figure 8:
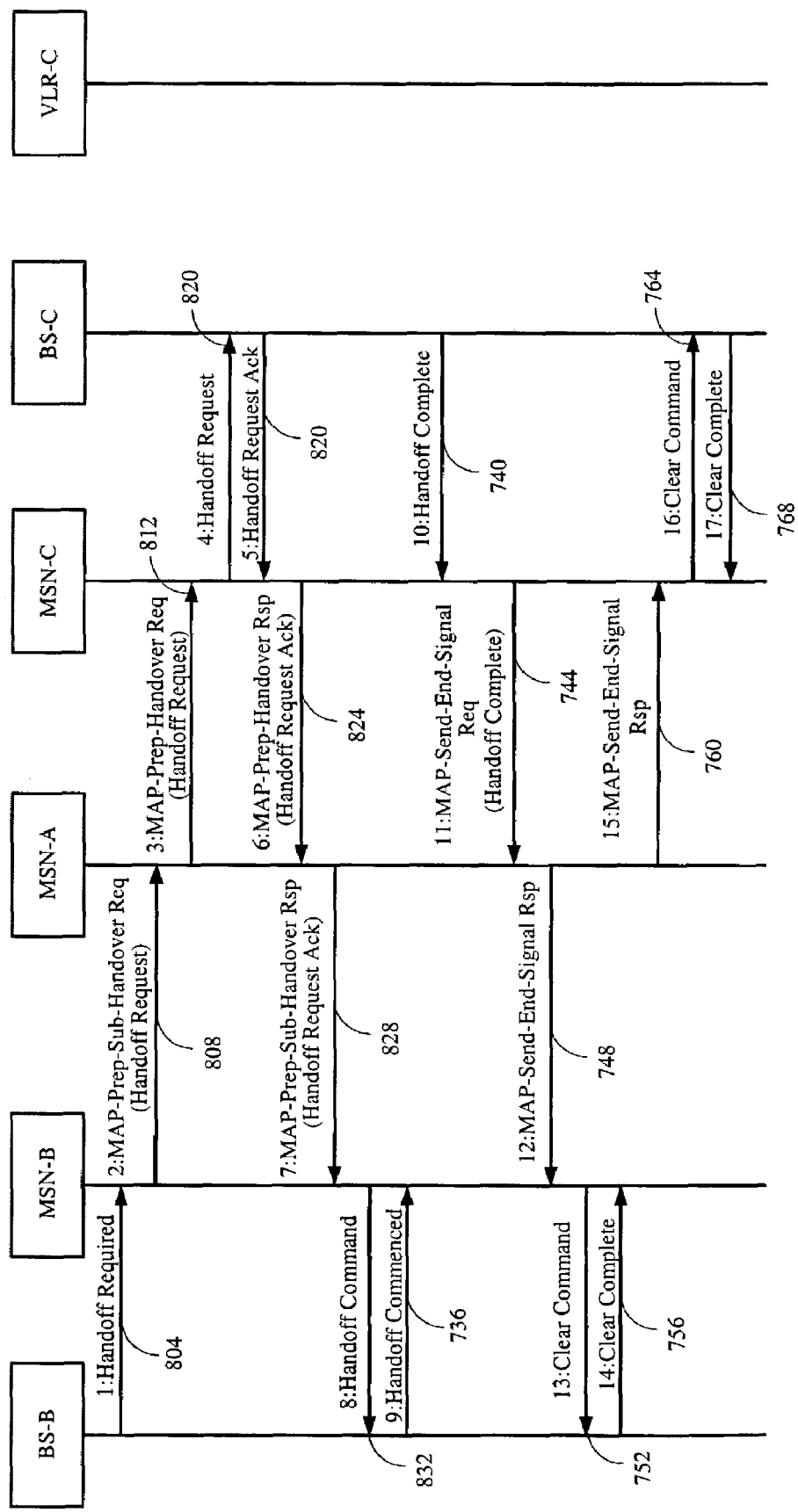
FIG. 8 illustrates a call flow diagram for a handover procedure from MSN-B to MSN-C that does not require a circuit connection between MSN-A and MSN-C.

FIG. 8 illustrates a call flow diagram for a subsequent handover procedure 800 from MSN-B to MSN-C, without a circuit connection between MSN-A and MSN-C. Handover is initiated by BS-B, by sending a handoff request message 804 to MSN-B. MSN-B then sends a MAP-prepare-subsequent-handover request 808 to MSN-A that indicates that new MSN number, that of MSN-C, and comprising a complete handoff request message. MSN-A then sends a MAP-prepare-handover request 812 to MSN-C, comprising a complete handoff request message. MSN-C then requests 816 the allocation of radio resources by sending the received handoff request message to BS-C. Upon successful allocation of radio resources, BS-C responds with a handoff request acknowledge message 820. Upon receiving the handover number, MSN-C returns a MAP-prepare-handover response 824 to MSN-A, comprising the complete handoff request acknowledge message received from BS-C.

MSN-A then sends a MAP-prepare-subsequent-handover response 828 to MSN-B, comprising the complete handoff request acknowledge message. MSN-B then initiates the handover command 832 to BS-B. In response, BS-B sends a handoff commenced message 736 to MSN-B. BS-C then sends a handoff complete message to MSN-C, comprising the complete handoff complete message. MSN-C then sends a MAP-send-end-signal request 744 to MSN-A, containing the complete handoff complete message. MSN-A then sends a MAP-send-end-signal response 748 to MSN-B to release the MAP resources in MSN-B. MSN-B then sends a clear command message 752 to BS-B to release the radio resources. In response, BS-B sends a clear complete message 756 to MSN-B, signaling that all of the resources have been cleared. MSN-A then sends a MAP-send-end-signal response 760 to MSN-C to release the MAP resources in MSN-C. MSN-C then sends a clear command message 764 to BS-C to release the radio resources. In response, BS-C sends a clear complete message 768 to MSN-C, signaling that all resources have been cleared.

Electrical connections, couplings, and connections have been described with respect to various devices or elements. The connections and couplings may be direct or indirect. A connection between a first and second device may be a direct connection or may be an indirect connection. An indirect connection may include interposed elements that may process the signals from the first device to the second device.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

The above description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A method of effecting hand-off of a call from a mobile station in a first wireless communication system of a first type having a first mobile switching node operable with a first base station and a second mobile switching node operable with a second base station, and a second wireless communication system of a second type, the method comprising:
   receiving a handoff request;
   requesting a handoff number, the handoff number used for routing the call from the first base station to the second base station;
   receiving the handoff number;
   transmitting a prepare handoff message, the prepare handoff message comprising the handoff number;
   sending an initial address message via at least one wireless network to initiate a circuit connection from the first mobile switching node to the second mobile switching node; and
   receiving the call,
   wherein at least one of the first mobile switching node or the second mobile switching node is suitable for mapping messages expected in formats and structures in the first wireless communication system of the first type to formats and structures in the second wireless communication system of the second type, the formats and structures in the first wireless communication system of the first type being different from the formats and structures in the second wireless communication system of the second type, and wherein the first wireless communication system is a Code Division Multiple Access (CDMA) system, the second wireless communication system is selected from a group consisting of an Integrated Digital Enhanced Network (iDEN) system and an Orthogonal Frequency Division Multiplexing (OFDM) system.

2. The method set forth in claim 1, wherein the prepare handoff message further comprises a handoff request acknowledge message.

3. An apparatus for effecting hand-off of a call from a mobile station in a first wireless communication system of a first type having a first mobile switching node operable with a first base station and a second mobile switching node operable with a second base station, and a second wireless communication system of a second type, the apparatus comprising:
   means for receiving a handoff request;
   means for requesting a handoff number, the handoff number used for routing the call from the first base station to the second base station;
   means for receiving the handoff number;
   means for transmitting a prepare handoff message, the prepare handoff message comprising the handoff number;
   means for sending an initial address message via at least one wireless network to initiate a circuit connection from the first mobile switching node to the second mobile switching node;
   means for receiving the call,
   wherein at least one of the first mobile switching node or the second mobile switching node is suitable for mapping messages expected in formats and structures in the first wireless communication system of the first type to formats and structures in the second wireless communication system of the second type, the formats and structures in the first wireless communication system of the first type being different from the formats and structures in the second wireless communication system of the second type, and wherein the first wireless communication system is a Code Division Multiple Access (CDMA) system, the second wireless communication system is selected from a group consisting of an Integrated Digital Enhanced Network (iDEN) system and an Orthogonal Frequency Division Multiplexing (OFDM) system.

4. The apparatus set forth in claim 3, wherein the prepare handoff message further comprises a handoff request acknowledge message.

5. A method of effecting hand-off of a call from a mobile station in a first wireless communication system of a first type having a first mobile switching node operable with a first base station and a second mobile switching node operable with a second base station, and a second wireless communication system of a second type, the method comprising:
   (a) receiving a handoff required message at the first mobile switching node;
   (b) sending a handoff request from the first mobile switching node to the second mobile switching node;
   (c) sending a message from the second mobile switching node to request allocation for a handoff;
   (d) in response to (c), receiving a handoff request acknowledge message;

(e) sending the handoff request acknowledge message from the second mobile switching node to the first mobile switching node;

(f) sending an initial address message via at least one wireless network to initiate a circuit connection between the first mobile switching node and the second mobile switching node;

(g) receiving the call from the first mobile switching node, wherein at least one of the first mobile switching node or the second mobile switching node is suitable for mapping messages expected in formats and structures in the first wireless communication system of the first type to formats and structures in the second wireless communication system of the second type, the formats and structures in the first wireless communication system of the first type being different from the formats and structures in the second wireless communication system of the second type, and wherein the first wireless communication system is a Code Division Multiple Access (CDMA) system, the second wireless communication system is selected from a group consisting of an Integrated Digital Enhanced Network (iDEN) system and an Orthogonal Frequency Division Multiplexing (OFDM) system.

6. The method as set forth in claim 5, further comprising:
(h) sending signal from the second mobile switching node to the first mobile switching node that a circuit for the call has been reserved;
(i) upon receipt of (h), sending a handoff execution message from the first mobile switching node;
(j) receiving a handoff commenced message at the first mobile switching node;
(k) receiving a handoff complete message at the second mobile switching node.

7. The method as set forth in claim 5, wherein (d) is received from the second wireless communication system.

8. An apparatus for effecting hand-off of a mobile station in a first wireless communication system of a first type having a first mobile switching node operable with a first base station and a second mobile switching node operable with a second base station, and a second wireless communication system of a second type, the apparatus comprising:
(a) means for receiving a handoff required message at the first mobile switching node;
(b) means for sending a handoff request from the first mobile switching node to the second mobile switching node;
(c) means for sending a message from the second mobile switching node to request allocation for a handoff;
(d) in response to (c), means for receiving a handoff request acknowledge message;
(e) means for sending the handoff request acknowledge message from the second mobile switching node to the first mobile switching node;
(f) means for sending an initial address message via at least one wireless network to initiate a circuit connection between the first mobile switching node and the second mobile switching node; and
(g) means for receiving the call from the first mobile switching node,
wherein at least one of the first mobile switching node or the second mobile switching node is suitable for mapping messages expected in formats and structures in the first wireless communication system of the first type to formats and structures in the second wireless communication system of the second type, the formats and structures in the first wireless communication system of the first type being different from the formats and structures in the second wireless communication system of the second type, and wherein the first wireless communication system is a Code Division Multiple Access (CDMA) system, the second wireless communication system is selected from a group consisting of an Integrated Digital Enhanced Network (iDEN) system and an Orthogonal Frequency Division Multiplexing (OFDM) system.

9. The apparatus as set forth in claim 8, further comprising:
(h) means for sending signal from the second mobile switching node to the first mobile switching node that a circuit for the call has been reserved;
(i) means for upon receipt of (h), sending a handoff execution message from the first mobile switching node;
(j) means for receiving a handoff commenced message at the first mobile switching node; and
(k) means for receiving a handoff complete message at the second mobile switching node.

10. The apparatus as set forth in claim 8, wherein (d) is received from the second wireless communication system.

11. An apparatus for effecting hand-off of a mobile station in a first wireless communication system of a first type having a first mobile switching node operable with a first base station and a second mobile switching node operable with a second base station, and a second wireless communication system of a second type, the apparatus comprising:
(a) a first mobile switching node configured to receive a handoff required message;
(b) a second mobile switching node coupled to the first mobile switching node and configured to receive a handoff request and to request allocation for a handoff; and
(c) a circuit to couple the first mobile switching node to the second mobile switching node and configured to transfer the call from the first mobile switching node to the second mobile switching node, the circuit being initiated using an initial address message sent via at least one wireless network,
wherein at least one of the first mobile switching node or the second mobile switching node is suitable for mapping messages expected in formats and structures in the first wireless communication system of the first type to formats and structures in the second wireless communication system of the second type, the formats and structures in the first wireless communication system of the first type being different from the formats and structures in the second wireless communication system of the second type, and wherein the first wireless communication system is a Code Division Multiple Access (CDMA) system, the second wireless communication system is selected from a group consisting of an Integrated Digital Enhanced Network (iDEN) system and an Orthogonal Frequency Division Multiplexing (OFDM) system.

12. A computer program product on a computer readable medium, comprising:
a computer-readable medium, comprising:
a method of effecting hand-off of a call from a mobile station in a first wireless communication system of a first type having a first mobile switching node operable with a first base station and a second mobile switching node operable with a second base station, and a second wireless communication system of a second type, the method comprising:
codes for causing a computer to receive a handoff request;

codes for causing a computer to request a handoff number, the handoff number used for routing the call from the first base station to the second base station;

codes for causing a computer to receive the handoff number;

codes for causing a computer to transmit a prepare handoff message, the prepare handoff message comprising the handoff number;

codes for causing a computer to send via at least one wireless network an initial address message to initiate a circuit connection between the first mobile switching node and the second mobile switching node; and codes for causing a computer to receive the call, wherein at least one of the first mobile switching node or the second mobile switching node is suitable for mapping messages expected in formats and structures in the first wireless communication system of the first type to formats and structures in the second wireless communication system of the second type, the formats and structures in the first wireless communication system of the first type being different from the formats and structures in the second wireless communication system of the second type, and wherein the first wireless communication system is a Code Division Multiple Access (CDMA) system, the second wireless communication system is selected from a group consisting of an Integrated Digital Enhanced Network (iDEN) system and an Orthogonal Frequency Division Multiplexing (OFDM) system.

13. A computer program product on a computer readable medium, comprising:

A computer-readable medium, comprising a method of effecting hand-off of a call from a mobile station in a first wireless communication system of a first type having a first mobile switching node operable with a first base station and a second mobile switching node operable with a second base station, and a second wireless communication system of a second type, the method comprising:

(a) codes for causing a computer to receive a handoff required message at the first mobile switching node;

(b) codes for causing a computer to send a handoff request from the first mobile switching node to the second mobile switching node;

(c) codes for causing a computer to send a message from the second mobile switching node to request allocation for a handoff;

(d) codes for causing a computer to receive a handoff request acknowledge message, in response to (c);

(e) codes for causing a computer to send the handoff request acknowledge message from the second mobile switching node to the first mobile switching node;

(f) codes for causing a computer to send via at least one wireless network an initial address message to initiate a circuit connection between the first mobile switching node and the second mobile switching node; and (g) codes for causing a computer to receive the call from the first mobile switching node, wherein at least one of the first mobile switching node or the second mobile switching node is suitable for mapping messages expected in formats and structures in the first wireless communication system of the first type to formats and structures in the second wireless communication system of the second type, the formats and structures in the first wireless communication system of the first type being different from the formats and structures in the second wireless communication system of the second type, and wherein the first wireless communication system is a Code Division Multiple Access (CDMA) system, the second wireless communication system is selected from a group consisting of an Integrated Digital Enhanced Network (iDEN) system and an Orthogonal Frequency Division Multiplexing (OFDM) system.

* * * * *